US012607701B1

(12) United States Patent
Tang

(10) Patent No.: US 12,607,701 B1
(45) Date of Patent: *Apr. 21, 2026

(54) WIRELESS LOCATION DEVICE PROTECTION APPARATUS

(71) Applicant: Hangzhou Yimao E-commerce Co., Ltd, Hangzhou (CN)

(72) Inventor: Peipeng Tang, Hangzhou (CN)

(73) Assignee: Hangzhou Yimao E-commerce Co., Ltd, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/324,159

(22) Filed: Sep. 10, 2025

Related U.S. Application Data

(63) Continuation of application No. 19/230,046, filed on Jun. 5, 2025, now Pat. No. 12,442,882.

(30) Foreign Application Priority Data

May 15, 2025 (CN) .......................... 202520964590.3

(51) Int. Cl.
| | |
|---|---|
| *H04L 1/00* | (2006.01) |
| *G01S 1/04* | (2006.01) |
| *H01Q 1/44* | (2006.01) |

(52) U.S. Cl.
CPC ................ *G01S 1/04* (2013.01); *H01Q 1/44* (2013.01)

(58) Field of Classification Search
CPC . H01L 22/12; H04B 1/08; H04B 1/03; H04M 1/0264; H04M 1/035; G02B 27/0172; G09G 3/32; G06F 3/1446; G06F 1/16; G06F 3/14; H04N 7/142
See application file for complete search history.

(56) References Cited

U.S. PATENT DOCUMENTS

2011/0243455 A1* 10/2011 Miyajima .......... G01C 21/3602
382/201

* cited by examiner

*Primary Examiner* — Phuoc H Doan
(74) *Attorney, Agent, or Firm* — Bayramoglu Law Offices

(57) ABSTRACT

The present application discloses a wireless location device protection apparatus including: a protection element including a first base portion and a second base portion, the first base portion including an enclosure portion and a window, the enclosure portion being gathered from a periphery of the first base portion towards the central axis, the gathered center of the enclosure portion being formed with the window; an inner space formed by enclosing between the first base portion and the second base portion for accommodating a wireless location device; a cover body accommodated in the inner space for covering the window; an upper surface of the wireless location device fits with a lower surface of the cover body, and an edge of the upper surface of the cover body fits with an inner wall face of the enclosure portion to form a face contact seal, improving waterproof capability.

20 Claims, 4 Drawing Sheets

1

WIRELESS LOCATION DEVICE PROTECTION APPARATUS

CROSS REFERENCE TO RELATED APPLICATIONS

The present application is a Continuation Application of U.S. Non-Provisional patent application Ser. No. 19/230, 046, filed on Jun. 5, 2025, entitled "Wireless Location Device Protection Apparatus", which claims the benefit of Chinese Patent Application No. 202520964590.3 filed on May 15, 2025, and the entire disclosure of which is hereby incorporated by reference into the present application for all purposes.

TECHNICAL FIELD

The present application relates to the technical field of tracking and location devices, and more particularly to a wireless location device protection apparatus.

BACKGROUND ART

Traditional AirTag protection cases feature an opening window that exposes the AirTag, allowing unobstructed signal transmission to maintain stable communication with paired devices such as smartphones, thereby enabling more precise item location tracking. However, the exposed window lacks protective measures, making it prone to dust accumulation and lacking waterproof capability, which leaves the AirTag vulnerable to damage and reduces its service life. Currently, some commercially available AirTag protection cases incorporate a protection cover to shield the window, which directly snaps onto the case housing via clips. Nevertheless, gaps exist between the protection cover and the housing, allowing liquids to penetrate into the interior of the housing, which fails to effectively protect the AirTag from damage, and the waterproof performance remains inadequate for practical usage requirements.

SUMMARY OF THE INVENTION

The embodiments of the present application provide a wireless location device protection apparatus intended to address the problem of poor waterproofing of existing AirTag protection cases.

In a first aspect, the present application provides a wireless location device protection apparatus including:

a protection element including a first base portion and a second base portion, the first base portion and the second base portion sharing a coaxial central axis, the first base portion including an enclosure portion and a window, the enclosure portion being gathered from a periphery of the first base portion towards the central axis, the gathered center of the enclosure portion being formed with the window;

an inner space formed by enclosing between the first base portion and the second base portion for accommodating a wireless location device;

a cover body accommodated in the inner space for covering the window;

wherein when the wireless location device is mounted to the inner space, an upper surface of the wireless location device fits with a lower surface of the cover body, and an edge of the upper surface of the cover body fits with an inner wall face of the enclosure portion to form a face contact seal.

The present application provides a wireless location device protection apparatus including: a protection element and a cover body, where the protection element includes a first base portion and a second base portion, the first base portion and the second base portion enclose with each other to form an inner space for accommodating a wireless location device, the first base portion has an enclosure portion converging from an edge to a central axis, a window is formed at the center of the enclosure portion, the cover body is accommodated in the inner space and shields the window, a lower surface of the cover body fits with the wireless location device, an edge of an upper surface of the cover body fits with an inner wall face of the enclosure portion to form a face contact seal, and a continuous face contact seal interface is formed by closely fitting with a large area, thereby increasing the penetration resistance of a liquid; it is more difficult for the external liquid to penetrate into the inner space from the gap, which improves the seal performance, improves the waterproof performance, protects the wireless location device and prolongs the service life.

BRIEF DESCRIPTION OF THE DRAWINGS

To more clearly illustrate the technical solutions of the embodiments of the present application, the drawings to be used in the description of the embodiments will be briefly introduced below. Obviously, the drawings in the following description show only some embodiments of the present application, and a person skilled in the art may obtain other drawings based on these drawings without creative efforts.

Figure 1:
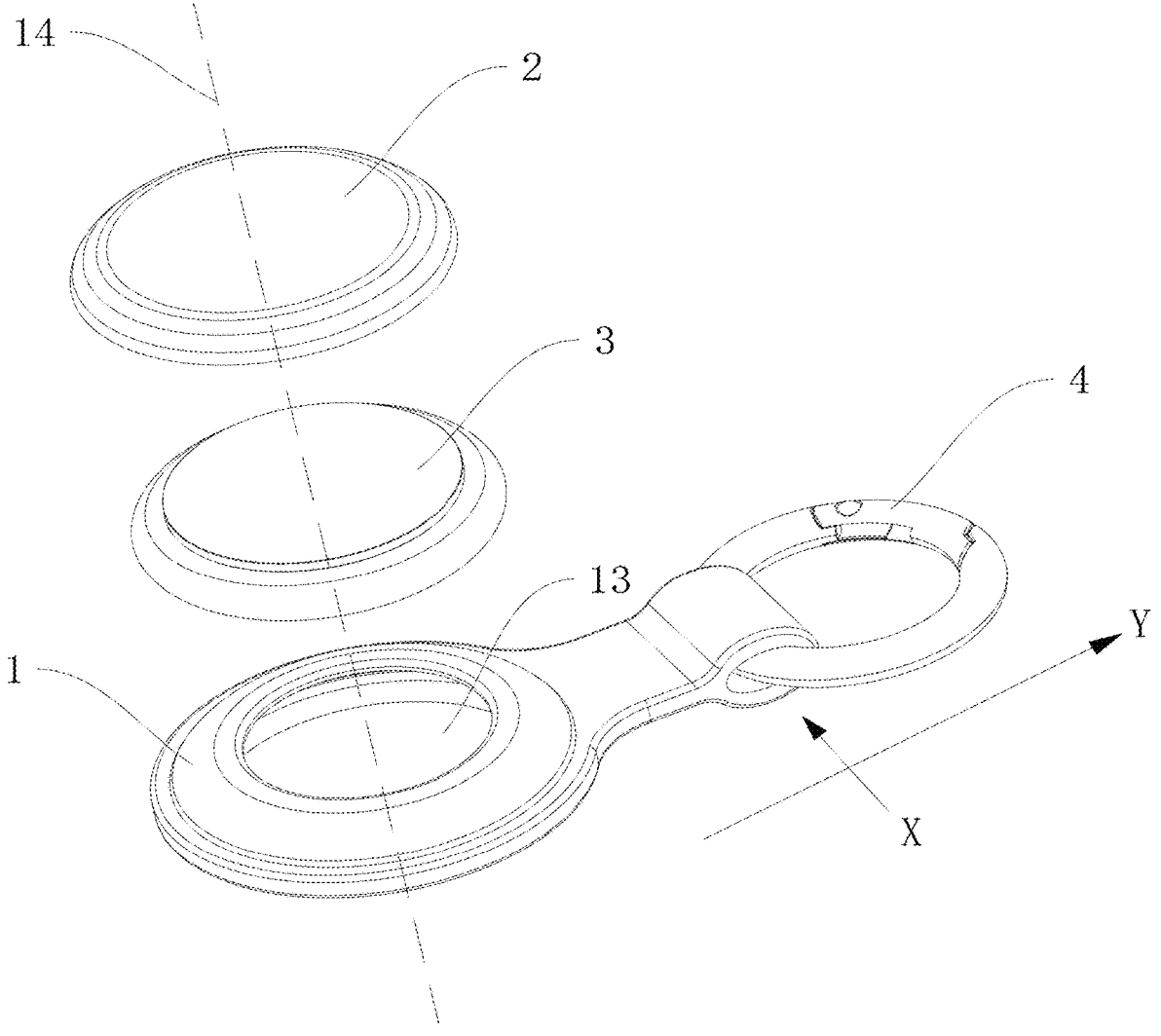
FIG. 1 illustrates an exploded view of a wireless location device protection apparatus according to an embodiment of the present application.

REFERENCE NUMERALS 1. protection element; 11. first base portion; 111. enclosure portion; 112. window; 113. annular protrusion; 114. annular location step; 12. second base portion; 13. inner space; 14. central axis; 15. periphery portion; 16. attachment portion; 161. attachment duct; 2. cover body; 21. annular groove; 22. shielding flange; 23. location groove; 3. wireless location device; 4. hanging member.

DETAILED DESCRIPTION OF THE INVENTION

The technical solutions in the embodiments of the present application will be clearly and completely described below in conjunction with the accompanying drawings in the embodiments of the present application. Obviously, the described embodiments are only part of the embodiments of the present application, rather than all of the embodiments. Based on the embodiments in the present application, all other embodiments obtained by a person skilled in the art without creative efforts shall fall within the protection scope of the present application.

The directional terms mentioned in the present application, such as "upper," "lower," "front," "rear," "left," "right," "inner," "outer," "side," etc., are only used with reference to the orientation of the accompanying drawings. Therefore, the directional terms are used to describe and understand the present application but not to limit the present application. In addition, in the drawings, structures that are similar or identical are denoted by the same reference numerals.

With the widespread application of wireless location devices (such as Apple AirTag) in scenarios including outdoor tracking and item localization, the waterproof and dustproof capabilities of their protection cases have become critical requirements. Existing protection cases predominantly employ either simple housing concatenation or cover body structures, which suffer from issues such as seal failure and excessive post-installation gaps. These deficiencies allow water and dust to readily penetrate the interior, resulting in device damage or performance degradation.

To address these limitations, the present disclosure provides a wireless location device protection apparatus. Through improvements in the fit structure between the cover body and the protection element, additional provision of seal and location structures, the apparatus significantly enhances both waterproof performance and mounting stability, thereby resolving the protective shortcomings of the protection apparatuses.

For a more comprehensive understanding of the aforementioned technical solutions, the following detailed description will be provided with reference to the accompanying drawings and particular embodiments of the description.

With reference to FIGS. 1-5, the embodiment of the present application shows a wireless location device protection apparatus 3 including: a protection element 1 and a cover body 2, where the protection element 1 includes a first base portion 11 and a second base portion 12, the first base portion 11 coincide with a central axis 14 of the second base portion 12, the first base portion 11 includes an enclosure portion 111 and a window 112, the enclosure portion 111 is gathered by a periphery of the first base portion 11 towards the central axis 14, the gathered center of the enclosure portion 111 is formed with the window 112; an inner space 13 formed by enclosing between the first base portion 11 and the second base portion 12 for accommodating a wireless location device 3; a cover body 2 accommodated in the inner space 13 for covering the window 112; where when the wireless location device 3 is mounted to the inner space 13, an upper surface of the wireless location device 3 fits with a lower surface of the cover body 2, and an edge of the upper surface of the cover body 2 fits with an inner wall face of the enclosure portion 111 to form a face contact seal.

Figure 2:
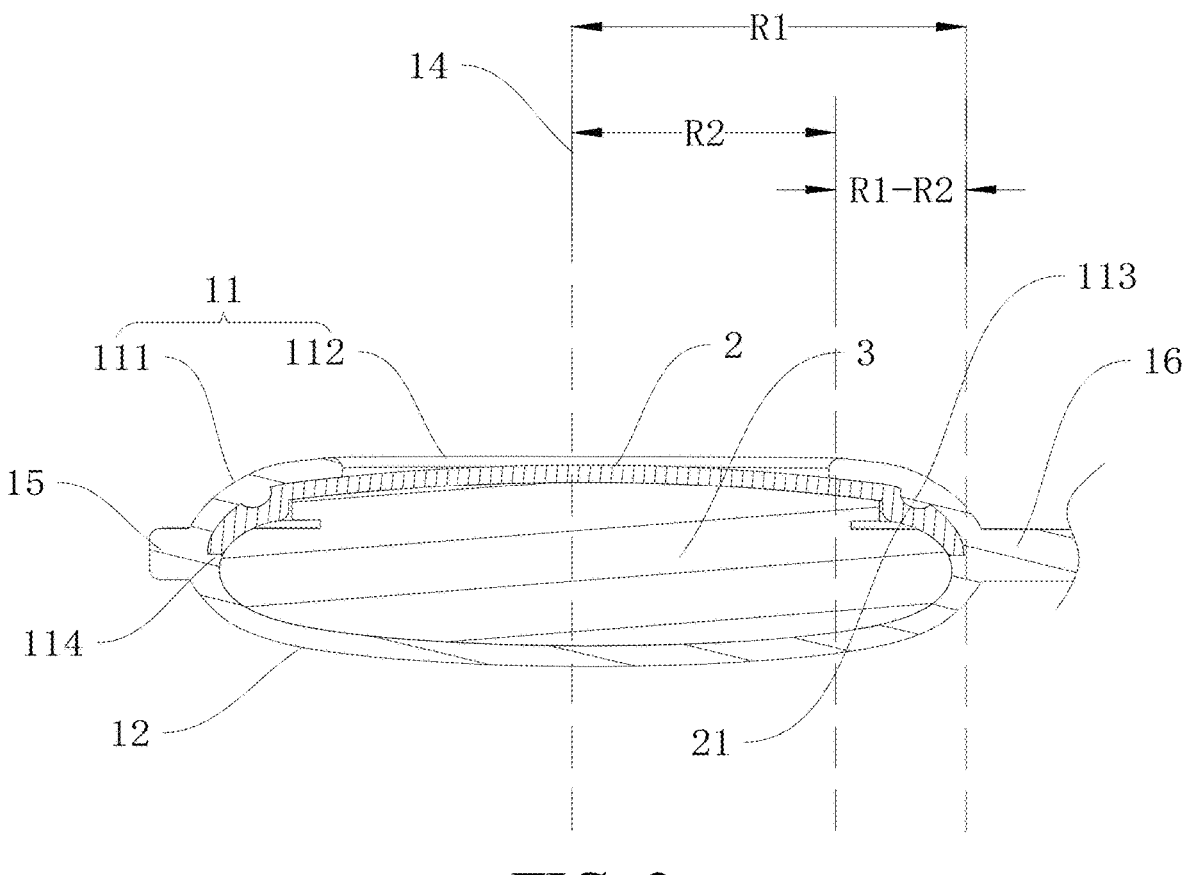
FIG. 2 illustrates a cross-sectional schematic view of a wireless location device protection apparatus according to an embodiment of the present application.

Referring to FIG. 2, specifically, the protection element 1 may be a protection case structure or a protection housing structure for wrapping to protect the wireless location device 3. The first base portion 11 and the second base portion 12 constitute a body portion of the protection element 1, the central axis 14 of the first base portion 11 coincides with the central axis 14 of the second base portion 12, the two are distributed up and down, the first base portion 11 serves as an upper half portion of the protection element 1, the second base portion 12 serves as a lower half portion of the protection element 1, and the first base portion 11 and the second base portion 12 are enclosed to form an inner space 13, and the inner space 13 is used for placing the wireless location device 3. The structure of the first base portion 11 includes an enclosure portion 111 and a window 112, where the enclosure portion 111, as a protection structure, gathers from the periphery of the first base portion 11 to the center but does not close, so that the gathered center of the enclosure portion 111 defines the window 112, and the whole first base portion 11 is in an arch structure with a flat top, where the flat top is the window 112, and the window 112 exposes the inner space 13. The window 112 serves as an installation inlet, the cover body 2 is inserted into the inner space 13 from the window 112, the window 112 is shielded from the inner space 13 by the cover body 2, impurities such as liquid or dust are prevented from entering the inner space 13 from the window 112, and the wireless location device 3 is protected. When the wireless location device 3 is installed in the inner space 13, the cover body 2 is first covered on the upper surface of the wireless location device 3, and then the cover body 2 and the wireless location device 3 are inserted together into the inner space 13 from the window 112 to be installed, thereby completing the assembly. In the inner space 13, the cover body 2 has its lower surface fit with the upper surface of the wireless location device 3, the central area of the upper surface shielding the window 112, and the edge area of the upper surface fits with the inner wall face of the enclosure portion 111, both of which are in surface-to-surface fit, so as to form a face contact seal. On the one hand, the large area of the upper surface edge of the cover body 2 and the inner wall face of the enclosure portion 111 are continuously fit to form a seal interface throughout the whole contact face, and the liquid needs to migrate slowly along the microscopic gaps of the whole contact face, so that the liquid permeation path is long, and the larger the contact area of the continuous seal interface is, the greater the liquid permeation resistance is, so the seal performance is better and the waterproof effect is improved. On the other hand, when the wireless location device 3 is installed in the inner space 13, a certain pressing force is generated, the cover body 2 is pressed toward the inner wall face of the enclosure portion 111, and the pressing force on the cover body 2 makes it closely fit the inner wall face of the enclosure portion 111, and the contact face is deformed, so that the width of a liquid-permeable gap is greatly reduced, thereby improving the seal performance and enhancing the waterproof effect.

According to the present embodiment, an edge of the upper surface of the cover body 2 is closely fit with the inner wall face of the enclosure portion 111 to form a face contact seal, so that the penetration resistance of the liquid is increased, and it is more difficult for the external liquid to penetrate into the inner space 13 from the gap, so that the seal performance is improved, the waterproof performance is improved, the wireless location device 3 is protected, and the service life is extended.

With continued reference to FIG. 2, in an embodiment, the interface between the edge of the upper surface of the cover body 2 and the inner wall face of the enclosure portion 111 is non-planar. Specifically, the contact face between the edge of the upper surface of the cover body 2 and the inner wall face of the enclosure portion 111 is designed as a non-planar structure, Specifically, one of the two is provided with a continuous arcuate protrusion, a wave-shaped curved face or a serrated truncated pyramid, and the other is formed with an adaptive groove or a complementary curved ace, so that a line-face or a point-face alternating seal interface is formed when the two are in contact. For example, the inner wall face of the enclosure portion 111 may have a sinusoidal waveform concave curved face, and correspondingly, the edge area of the upper surface of the cover body 2 protrudes outward to form a cosine waveform structure, and a plurality of continuous seal lines are formed in the circumferential direction when the two are fit with each other. Compared with the planar fit, the non-planar contact face further improves the contact tightness and long-term reliability through geometry optimization on the basis of maintaining a large-area continuous seal, and meets stringent water-proofing requirements for outdoor applications. It will of course be appreciated that the contact face may also be of other non-planar configuration, for example the contact face may be a cambered surface. Specifically, the inner wall face of the enclosure portion 111 has a continuous arcuate concave curved face structure, and the upper surface edge of the cover body 2 is adapted to form a matching arcuate arched structure, so that a cambered surface fitting structure is formed when the two are brought into contact. When the wireless location device 3 is installed in the inner space 13, the cover body 2 is pressed in the vertical direction, and the arcuate arched edge of the cover body is radially expanded and deformed along the arcuate inner wall face of the enclosure portion 111, so as to form a close fit according to the curvature of the inner wall of the enclosure portion 111. The range of the radius of curvature of the arcuate contact face can be set according to practical requirements to maximize the length of the contact path in a limited space. In the assembled state, the arcuate arched structure of the edge of the cover body 2 is closely fit with the arcuate concave curved face structure of the inner wall of the enclosure portion 111, and the contact portion between the two extends continuously in the circumferential direction to form an annular closed seal strip. This arcuate contact structure has the advantage of double seal strengthening: first, under static conditions, the tangential direction of the arcuate contact face makes an included angle with a liquid permeation path, which forces the liquid to penetrate along the curved face with a deflection, and significantly increases the penetration resistance; secondly, in the dynamic extrusion process, the arcuate arched structure of the edge of the cover body 2 is plastically deformed to press against the inner wall face of the enclosure portion 111, so that the actual gap width of the contact interface is further reduced. The arcuate contact face design of the present embodiment significantly increases the difficulty of liquid penetration and improves water resistance as compared to a planar contact seal structure.

With continued reference to FIG. 2, in an embodiment, the interface between the edge of the upper surface of the cover body 2 and the inner wall face of the enclosure portion 111 extends from the window 112 to the edge of the first base portion 11. Specifically, the contact face between the edge of the upper surface of the cover body 2 and the inner wall face of the enclosure portion 111 starts from the periphery of the window 112 and continues outward along the inner wall face of the enclosure portion 111 up to the end of the edge of the first base portion 11, forming a continuous seal interface throughout the height of the enclosure portion 111. The contact face extends from the window 112 to the edge of the first base portion 11, so that the length of the liquid perme-ation path reaches the full height of the inner wall of the enclosure portion 111 (i.e., the distance from the window 112 to the edge of the body), which is longer than the permeation path of conventional local contact designs (e.g., seal only in the vicinity of the window 112). The liquid needs to migrate along the whole inner wall face, the penetration resistance increases, and the water-proof grade is significantly improved.

In an embodiment, a radius of the first base portion 11 is R1 and a radius of the window 112 is R2, where R2 and R1 satisfy: $10\% \leq (R1-R2)/R1 \leq 85\%$. Specifically, the radius of the first base portion 11 is R1, and the radius of the window 112 is R2, both satisfying the proportional relationship of $10\% \leq (R1-R2)/R1 \leq 85\%$, where (R1−R2) corresponds to the width of the contact face between the edge of the upper surface of the cover body 2 and the inner wall face of the enclosure portion 111. The design achieves an optimal balance between waterproofing performance and ease of assembly by accurately defining the width of the contact face: when $(R1-R2)/R1 \geq 10\%$, the width of contact face is wide enough to ensure that there is enough resistance length when liquid penetrates along the tortuous path of non-planar interface, so as to avoid the seal failure caused by too narrow contact face; when $(R1-R2)/R1 \leq 85\%$, the window size R2 retains sufficient open space (e.g., R2≥3.5 mm when R1=10 mm) to allow the cover body 2 and the wireless location device 3 to fit smoothly through the window 112, avoiding mounting jams or over-extrusion of the flexible material of the a protection element 1 due to a window 112 being too small. By means of the ratio constraint, on one hand, it is ensured that the size of the window 112 is sufficient to accommodate the assembly of the cover body 2 and the wireless location device 3 to be smoothly inserted into the inner space 13, so that the operator can apply force naturally to complete the assembly, so as to avoid installation jam-ming or scratching on the surface of the device caused by the too small window 112; on the other hand, the limitation of the proportion of the window 112 allows the enclosure portion 111 to retain an annular contact area of sufficient width, and the non-planar contact face between the edge of the cover body 2 and the inner wall of the enclosure portion 111 covers the entire circumferential extent of the edge of the upper surface of the cover body 2, forcing the liquid or dust to migrate along a non-planar path, significantly pro-longing the permeation path and increasing the migration resistance as compared to a fully open window 112 structure of undefined proportion. The aforementioned ratio range accurately balances the contradictory requirements of assembly convenience and seal strength, which not only ensures the fluency of installation operation, but also achieves the synergistic improvement of waterproof and dustproof performance through the optimized contact area and path complexity, so as to solve the double problems of seal failure and assembly difficulty caused by blind enlarge-ment or reduction of the size of the window 112 in the traditional design.

In an embodiment, a seal structure is provided between the edge of the upper surface of the cover body 2 and the inner wall face of the enclosure portion 111. Specifically, a seal structure is additionally provided between the edge of the upper surface of the cover body 2 and the inner wall face of the enclosure portion 111. The seal structure may be various, such as a seal ring, a sealant layer, a concave-convex fit structure, etc., which is not limited herein. By introducing the seal structure, the liquid penetration can be blocked between the cover body 2 and the enclosure portion 111, the blocking ability of the liquid penetration can be significantly improved, the waterproof and dustproof per-formance can be significantly improved compared with the basic design without the seal structure, and the intrusion of impurities such as water and dust into the inner space 13 from between the cover body 2 and the enclosure portion 111 can be effectively blocked, providing more reliable protection for the wireless location device 3.

Figure 3:
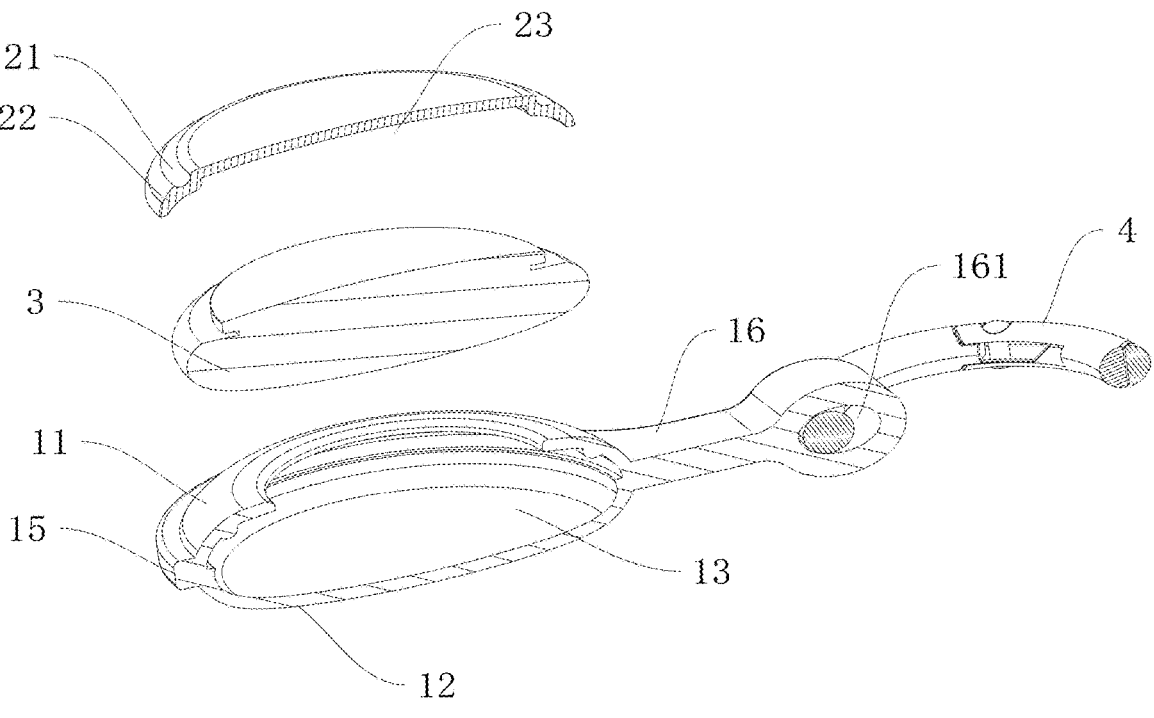
FIG. 3 illustrates a cross-sectional exploded view of a wireless location device protection apparatus according to an embodiment of the present application.

Referring to FIGS. 2 and 3, in an embodiment, the seal structure includes an annular groove 21 and an annular protrusion 113, the annular protrusion 113 being provided on one of the edge of the upper surface of the cover body 2 and the inner wall face of the enclosure portion 111, the annular groove 21 being provided on the other of the edge of the upper surface of the cover body 2 and the inner wall face of the enclosure portion 111, the annular protrusion 113 being engaged with the annular groove 21. Specifically, the seal structure includes an annular groove 21 and an annular protrusion 113 which fit with each other. The annular protrusion 113 is integrated on the inner wall face of the enclosure portion 111, and extends continuously in the circumferential direction to form a closed loop structure, the cross section of which is a semi-circular raised rib; and the annular groove 21 is correspondingly provided on the edge of the upper surface of the cover body 2, and the cross section thereof is a circular arc channel matching with a raised rib, forming an interference fit space. It will of course be appreciated that the position of the annular groove 21 and the annular protrusion 113 can also be interchanged and will not be described in any greater detail herein. When the wireless location device 3 is installed in the inner space 13, the cover body 2 is pressed to move toward the inner wall of the enclosure portion 111, causing the raised ribs to become embedded in the groove and radially compressively deform, filling the voids in the groove. By the design for engaging the annular groove 21 with the protrusion, the penetration path of the liquid is blocked, and the waterproof property is further improved.

In an embodiment, a location structure is provided between the edge of the upper surface of the cover body 2 and the inner wall face of the enclosure portion 111. Specifically, a location structure is additionally provided between the edge of the upper surface of the cover body 2 and the inner wall face of the enclosure portion 111. The location structure may be various, such as the fit of the location protrusion and the location groove 23, the fit of the guide post and the guide hole, the magnetic attraction location assembly, etc., which is not limited herein. By introducing the location structure, a precise relative positional relationship may be established between the cover body 2 and the enclosure portion 111, ensuring that the two are aligned quickly and without offset during the assembly process, avoiding partial seal failure due to installation deviation. At the same time, the location structure is provided to restrict displacement of the cover body 2 in an inner space 13, prevent the cover body from being loosened or dislocated when the cover body is used for a long time or is impacted by an external force, and always keep an upper surface edge of the cover body 2 in a stable face contact seal state with the inner wall face of the enclosure portion 111. The structure strengthens the reliability of the seal interface by means of physical limiting, significantly improves waterproof and dustproof performance compared with the basic design without location structure, and effectively blocks impurities such as water and dust from entering the inner space 13 from between the cover body 2 and the enclosure portion 111, providing more reliable protection for the wireless location device 3.

Referring to FIGS. 2 and 3, in an embodiment, the location structure includes an annular groove 21 and an annular protrusion 113, the annular protrusion 113 being provided on one of the edge of the upper surface of the cover body 2 and the inner wall face of the enclosure portion 111, the annular groove 21 being provided on the other of the edge of the upper surface of the cover body 2 and the inner wall face of the enclosure portion 111, the annular protrusion 113 being engaged with the annular groove 21. Specifically, the location structure includes an annular groove 21 and an annular protrusion 113 which fit with each other. The annular protrusion 113 is integrated on the inner wall face of the enclosure portion 111, and extends continuously in the circumferential direction to form a closed loop structure, the cross section of which is a semi-circular raised rib; and the annular groove 21 is correspondingly provided on the edge of the upper surface of the cover body 2, and the cross section thereof is a circular arc channel matching with the semi-circular raised rib, forming a guiding limiting space. It will of course be appreciated that the position of the annular groove 21 and the annular protrusion 113 can also be interchanged and will not be described in any greater detail herein. When the cover body 2 is mounted to the inner space 13, the insertion of the annular protrusion 113 along the annular groove 21 achieves a precise centering by the fit of a concavo-convex structure while limiting the displacement of the cover body 2. Through the design for engaging the annular groove 21 with the annular protrusion 113, a mechanical limiting relationship is established between the cover body 2 and the enclosure portion 111, ensuring that the two are quickly aligned and have no offset during assembly, and effectively restricting the shaking of the cover body 2 during use, so that the upper surface edge of the cover body 2 and the inner wall face of the enclosure portion 111 always maintain a stable fit position. Through the precise fit of geometric shapes, the assembly accuracy and structural stability are significantly improved, which provides a reliable position guarantee for the face contact seal interface and effectively avoids the seal failure caused by the offset of the cover body 2.

Referring to FIG. 3, in an embodiment, the lower surface of the cover body 2 is recessed to form a location groove 23 for receiving a top of an upper surface of the wireless location device 3. Specifically, the lower surface of the cover body 2 is recessed and formed with a location groove 23 matching a top profile of the upper surface of the wireless location device 3, and the inner wall face thereof forms a guided fit space with the top of the device; during assembly, an operator inserts the top of the wireless location device 3 into the location groove 23, achieves rapid pre-location of the cover body 2 and the device through the circumferential constraint on the edge of the device by the inner wall of the groove, so that the two form a stable temporary combination body, and then pushes the combination body into the inner space 13 along the window 112 of the protection element 1 to complete the installation, so as to avoid the slip dislocation problem caused by the smooth surface of the device when the cover body 2 is installed alone; after the installation is completed, the location groove 23 continuously limits the horizontal movement of the device in the inner space 13, prevents the relative displacement between the device and the lower surface of the cover body 2 due to external vibration or impact, ensures uniform pressure distribution at the seal interface between the edge of the upper surface of the cover body 2 and the inner wall of the enclosure portion 111, and at the same time eliminates the risk of local increase of the seal gap caused by the inclination of the device, achieves the double location guarantee from the assembly stage to the use stage, and significantly improves the assembly efficiency and the seal reliability.

With continued reference to FIG. 3, in an embodiment, a periphery of the cover body 2 is bent toward a side wall of the wireless location device 3 to form a shielding flange 22, an inner wall of the shielding flange 22 being adapted to fit with at least a portion of the side wall of the wireless location device 3. Specifically, the periphery of the cover body 2 is bent towards the side wall of the wireless location device 3 to form an annular shielding flange 22 which extends downwards along the edge of the cover body 2 and partially wraps the side wall of the wireless location device 3, and the inner wall thereof fits with the side wall of the device; the structure achieves installation pre-location by wrapping the shielding flange 22 on the side wall of the device, and when the cover body 2 is covered on the upper surface of the wireless location device 3, the contact between the shielding flange 22 and the side wall of the device generates a mechanical limiting function, so as to guide the operator to accurately align the relative position of the cover body 2 and the device, and then the cover body 2 and the device as an integral module can be smoothly pushed into the inner space 13 from the window 112 to complete assembly; the bending structure of the shielding flange 22 automatically corrects the offset of the cover body 2 through the side wall contact during the installation process, so as to avoid the dislocation of the seal interface caused by the manual alignment deviation, and at the same time simplifies the assembly steps, so as to solve the technical problem that the cover body 2 of the existing protection apparatus is easily inclined and difficult to be quickly positioned when the cover body 2 is installed separately from the device, thereby significantly improving the assembly efficiency and reducing the risk of seal failure caused by the installation error.

Figure 4:
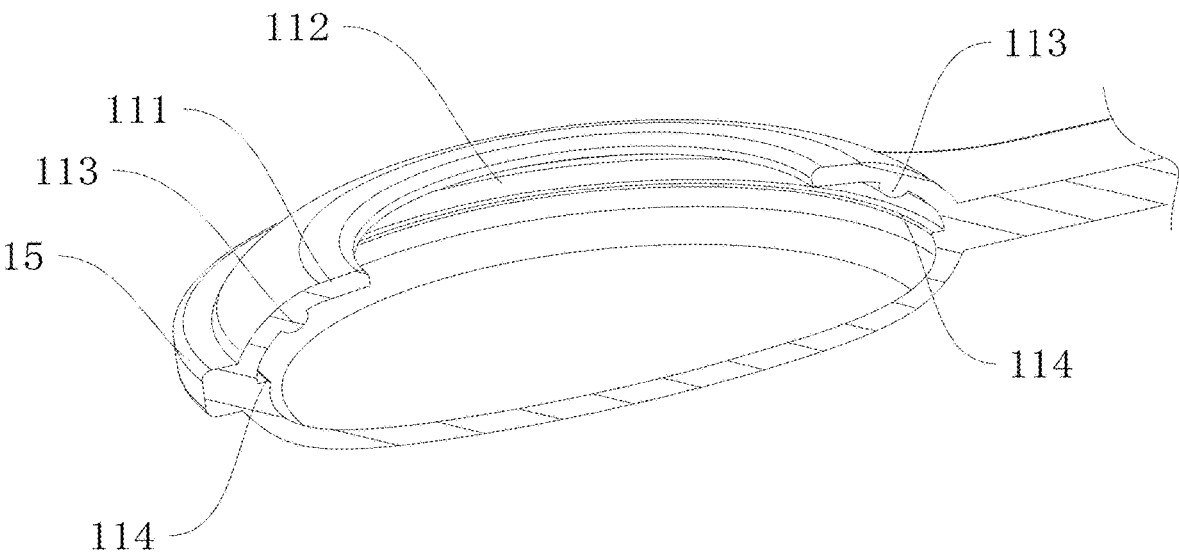
FIG. 4 illustrates an enlarged partial view of FIG. 3.

Referring to FIGS. 2 and 4, in an embodiment, an inner wall of the first base portion 11 or the second base portion 12 is convexly provided with an annular location step 114 that supports a lower end edge of the cover body 2. Specifically, an annular location step 114 is integrated on the inner wall of the first base portion 11 or the second base portion 12, and the annular location step 114 extends continuously in the circumferential direction to form a closed-loop support structure, the top face of which is a horizontal bearing face, and is supported in face contact with the lower end edge of the cover body 2. When the cover body 2 is mounted to the inner space 13, the lower end edge thereof is precisely seated on the annular location step 114, and the upper surface of the step provides a stable support for the cover body 2, limiting the downward displacement thereof. In this way, the cover body 2 is accurately fixed at this position by means of mechanical limiting, so that the cover body 2 is prevented from sinking or tilting due to misoperation during installation or vibration during use, the separation of the seal interface between the cover body 2 and the enclosure portion 111 is suppressed under vibration or impact load, the integrity of the seal path is maintained, and it is ensured that the upper surface edge of the cover body 2 and the inner wall face of the enclosure portion 111 always maintain a preset fit pressure and seal state. The provision of the annular location step 114 also enables a clear assembly reference to be formed between the cover body 2 and the base portion, so that the combination of the cover body 2 and the wireless location device 3 can be quickly aligned with the window 112 and pushed into an installed position, making installation more convenient.

In other embodiments, the inner wall of the second base portion 12 is concavely formed with at least one vibration-damping groove. Specifically, the vibration-damping groove is integrated on the inner wall of the second base portion 12, and the shape thereof can be designed according to practical requirements, and generally has a rectangular shape, a circular shape, or an elliptical shape, which is not limited herein. The depth of the vibration-damping groove may be adjusted according to the size of the second base portion 12 and the magnitude of the impact force that is expected to be experienced. The vibration-damping grooves are circumferentially distributed along the inner wall of the second base portion 12, and the number thereof can be set according to the requirements of protection, and is at least one. When the wireless location device 3 is installed in the inner space 13, the vibration-damping groove can play an important role if the device is subjected to an external impact force (e.g., a drop, collision). The presence of the groove provides the inner wall of the second base portion 12 with a certain space for resilient deformation, and when an impact force is transmitted to the second base portion 12, the material of the inner wall can deform into the groove, thereby absorbing and dispersing the impact force. This resilient deformation effectively cushions direct impact to the wireless location device 3, reducing the risk of damage to the device due to external forces.

With continued reference to FIG. 4, in an embodiment, the protection element 1 further includes a periphery portion 15 circumferentially provided at the juncture of the side wall of the first base portion 11 and the side wall of the second base portion 12. Specifically, the periphery portion 15 is a flared skirt structure surrounding the juncture of the side walls of the first base portion 11 and the second base portion 12, has a diameter greater than the outer diameter of the first base portion 11 and the second base portion 12, has an arcuate or right-angle extension shape in cross section, and is continuously closed and arranged along the peripheral direction of the base portions. The periphery portion 15 can be integrated with the first base portion 11 and the second base portion 12 through an injection molding process, and the outer wall faces thereof extend outwards to form a protruding protective edge, so as to form a full-covering protection for the juncture of the base portions. When the protection apparatus is subjected to a side impact or fall, the periphery portion 15 preferentially contacts an external object, absorbs an impact force through resilient deformation or rigid support thereof, prevents the first base portion 11 and the second base portion 12 from being directly damaged by a force, and significantly improves the impact resistance performance of the protection apparatus.

With continued reference to FIG. 3, in an embodiment, the protection element 1 further includes an attachment portion 16 formed by the side walls of the first base portion 11 and the second base portion 12 extending away from the central axis 14. Specifically, the protection element 1 further includes an attachment portion 16 formed by horizontally extending the side walls of the first base portion 11 and the second base portion 12 in the direction away from the central axis 14 (the Y direction) and integrated with the base portions, the outer shape of the attachment portion 16 may be designed as a rectangular, circular, or irregular polygonal shape, and the attachment portion 16 of the present embodiment is of a lug structure. This structure provides an external fixing point for the protection apparatus by means of outwardly extending lugs. When the user needs to mount the apparatus to a keychain, a backpack strap, or a vehicle-mounted holder, through ducts or snap grooves on the lugs can be directly used to adapt to hanging ropes, clips, or mounting brackets, so as to achieve portable or scene-based application of the protection apparatus.

Referring to FIGS. 1 and 3, in the present embodiment, an end of the attachment portion 16 away from the central axis 14 is provided with an attachment duct 161 therein, an axis of the attachment duct 161 is perpendicular to the central axis 14, and the attachment duct 161 extends through the end in the direction (the X-direction) perpendicular to the extension direction of the attachment portion 16 and has a preset length. Specifically, after the attachment portion 16 is formed extending from the side walls of the first base portion 11 and the second base portion 12 in the direction away from the central axis 14, an attachment duct 161 is provided at an end thereof away from the central axis 14, and an axis of the attachment duct 161 is maintained in a perpendicular relationship with the central axis 14. The attachment duct 161 extends through the end in the direction perpendicular to the extension direction of the attachment portion 16, and has a preset length which can be flexibly designed according to the requirements of practical use. When a key ring, a rope or a hook is connected, the feature that the axial direction of the attachment duct 161 is perpendicular to the central axis 14 enables the hanging member 4 to naturally form an anti-torsion support after being inserted in the radial direction, and a pre-set penetration length ensures that the contact area between the hanging member 4 and the inner wall of the duct is maximized, so as to prevent the hook from rotating or slipping off under a load; at the same time, the transverse extension direction of the channel is orthogonal to the extension direction of the attachment portion 16, so that the hanging force is decomposed into a component parallel to the side wall of the base portion, avoiding concentrated bending moments at the root of the attachment portion 16 caused by suspended loads, effectively addressing the issue of structural fatigue fractures commonly encountered with traditional lateral hanging holes and prolonging service life.

Figure 5:
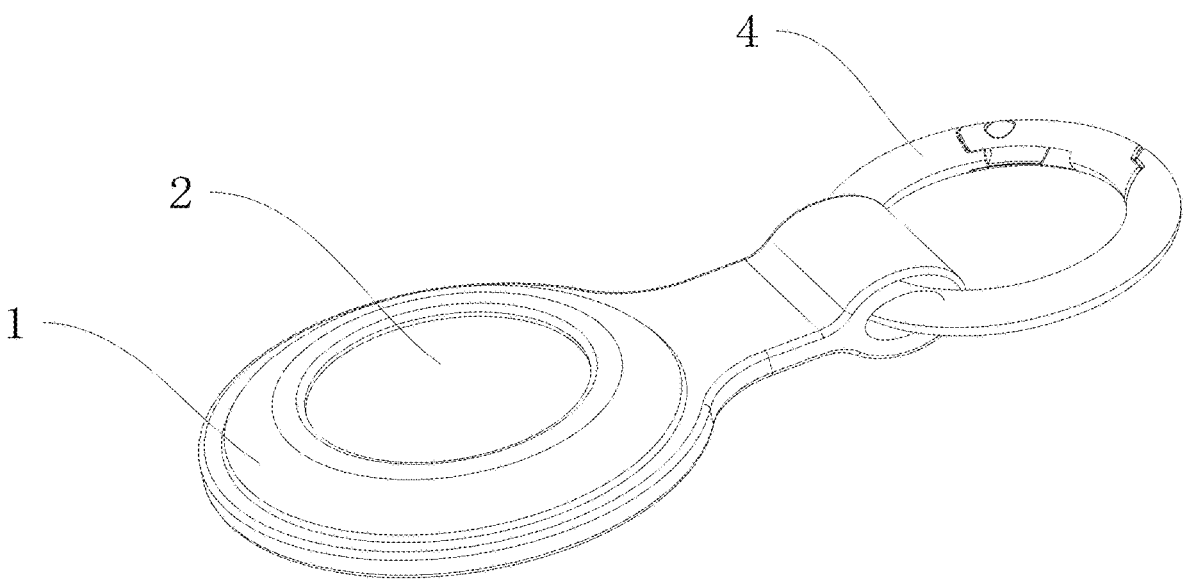
FIG. 5 illustrates a schematic view of a wireless location device protection apparatus according to an embodiment of the present application.

Referring to FIGS. 3 and 5, in the present embodiment, the wireless location device 3 protection apparatus further includes a hanging member 4 which extends through the attachment duct 161. Specifically, the hanging member 4 is a key ring, hook or rope structure adapted to the attachment duct 161, the diameter or cross-sectional dimension of which matches the inner diameter of the attachment duct 161, and extends through the attachment duct 161 in an interference fit or a clearance fit. When the hanging member 4 extends through, it is inserted axially along the attachment duct 161 (in the direction perpendicular to the central axis 14), making a circumferential contact with the inner wall by means of a preset extending through length of the duct, for example, a metal ring body such as a key ring can be completely embedded in the duct, and the stem part of the hook is closely fit with the inner wall of the duct. The design enables a connection point of the hanging member 4 and the protection apparatus to be located at the end of the attachment portion 16, and the load direction is perpendicular to the central axis 14, so that the gravity or tensile force when the wireless location device 3 is suspended can be effectively dispersed, when the gravity of the hanging member 4 is transmitted to the attachment portion 16 through the attachment duct 161, the load is decomposed into horizontal components along the side wall of the base portion because the duct axis is perpendicular to the central axis 14, so that the vertical bending moment at the root of the attachment portion 16 is avoided, and the risk of fatigue fracture of the structure is reduced; at the same time, the close contact between the hanging member 4 and the duct can prevent the hanging member 4 from rotating or slipping off in use, which is particularly applicable to the high-frequency hanging scene such as a key and a backpack. The material of the hanging member 4 can be selected from metal, plastic or resilient rope, and the surface thereof can be additionally provided with anti-skid lines or barb structures, so as to further enhance the connection reliability with the attachment duct 161, so as to enable the protection apparatus to have a waterproof seal performance, and at the same time, to achieve convenient carrying and fixing via the hanging member 4, so as to meet the user's diverse use requirements.

In an embodiment, the first base portion 11, the second base portion 12, the cover body 2, and the window 112 are all radially symmetric about the central axis. Specifically, the first base portion 11, the second base portion 12, the cover body 2 and the window 112 all have a radially symmetrical structure on the basis of the central axis 14, that is to say, the outer profile, the side wall thickness, the opening position and the functional structure of each component (such as the enclosure portion 111, the annular location step 114, the annular groove 21, the annular protrusion 113, the location groove 23, etc.) are all uniformly distributed radially along the central axis 14, forming a regular geometric form such as a circle and a regular polygon. This radially symmetrical design allows the protection apparatus to maintain structural consistency in any radial cross section: when a squeezing force or an external impact force is generated after the wireless location device 3 is installed, the load can be uniformly transmitted to the first base portion 11 and the second base portion 12 and the cover body 2 along the central axis 14, so as to avoid local stress concentration caused by the structural bias and significantly improve the strength of the overall structure; at the same time, the symmetrical window 112 and the edge of the cover body 2 ensure that the seal pressure of the non-planar contact face between the inner wall face of the enclosure portion 111 and the upper surface of the cover body 2 is uniformly distributed in the circumferential direction, the liquid permeation resistance is kept consistent in all directions, and the reliability of the waterproof performance is enhanced. In addition, the radially symmetric geometry allows the components to be assembled without the need to distinguish angles, to achieve rapid alignment by locating the central axis 14, to improve production efficiency, and to precisely fit a circular or quasi-circular wireless location device 3 (e.g., AirTag), and to provide a stable seal and protective base for the inner space 13 by reducing device sloshing or deflection after installation via a symmetric support face.

Referring to FIG. 3, in an embodiment, the inner space 13 has a flat spherical shape. Specifically, the inner space 13 has the shape of a flat sphere, the outline of which is an ellipsoid with a minor axis perpendicular to the central axis 14 and a major axis extending in the radial direction, adapted to the flattened circular shape of the wireless location device 3 (e.g., AirTag). The space design enables the device to form a curved face fit with the inner wall of the first base portion and the second base portion 12 after installation, reduces the assembly gap, and at the same time, enables the squeezing force generated by the device to be uniformly distributed along the flat spherical face, drives the upper surface edge of the cover body 2 to be more closely fit with the inner wall face of the enclosure portion 111, further improves the waterproof performance from the space geometric level, and ensures that the device can obtain a stable support and reliable protection in a narrow space.

In an embodiment, the protection element 1 is integrated. Specifically, the protection element 1 is made by an integral injection molding process, and the first base portion 11 and the second base portion 12 can be joined to form a seamless piece by using silicone or TPU material. Compared with the traditional split-type protection case which has the characteristic of assembly joint, the protection element 1 in the present embodiment is integrated to form an integral structure free of concatenation seam, which significantly improves the structural strength and seal reliability, and is easy to assemble.

In an embodiment, the protection element 1 is of a flexible structure. Specifically, the protection element 1 can be made of a flexible structure made of a resilient material, such as silicone, TPU, etc., the whole of which can resiliently deform. The flexible property enables the enclosure portion 111 of the first base portion 11 to be resiliently expanded outwards when the cover body 2 is assembled with the wireless location device 3, so that the two can be easily plugged into the inner space 13 from the window 112; after the installation is completed, the restoring force of the flexible material urges the inner wall of the enclosure portion 111 to closely fit with the edge of the upper surface of the cover body 2, and at the same time, the gap is further eliminated by the resilient compression of the material itself, so as to enhance the reliability of the face contact seal and improve the waterproof performance.

The foregoing descriptions merely represent specific embodiments of the present application. However, the scope of protection sought by the present application is not limited thereto. Any person skilled in the relevant technical field may readily conceive of various equivalent modifications or substitutions within the technical scope disclosed in the present application. Such modifications or substitutions shall all fall within the protection scope of the present application. Accordingly, the protection scope of the present application shall be subject to the scope defined by the claims.

The invention claimed is:

1. A wireless location device protection apparatus, comprising:
a protection element comprising a first base portion and a second base portion, the first base portion and the second base portion sharing a coaxial central axis, the first base portion comprising an enclosure portion and a window, the enclosure portion being gathered from a periphery of the first base portion towards the central axis, the gathered center of the enclosure portion being formed with the window;
an inner space formed by enclosing between the first base portion and the second base portion for accommodating a wireless location device;
a cover body accommodated in the inner space for covering the window;
wherein a contact face between the edge of the upper surface of the cover body and the inner wall face of the enclosure portion is non-planar.

2. The wireless location device protection apparatus according to claim 1, wherein when the wireless location device is mounted to the inner space, an upper surface of the wireless location device fits with a lower surface of the cover body, and an edge of the upper surface of the cover body fits with an inner wall face of the enclosure portion to form a face contact seal.

3. The wireless location device protection apparatus according to claim 1, wherein the contact face is a cambered surface.

4. The wireless location device protection apparatus according to claim 1, wherein the contact face between the edge of the upper surface of the cover body and the inner wall face of the enclosure portion extends from the window to an edge of the first base portion.

5. The wireless location device protection apparatus according to claim 4, wherein a radius of the first base portion is R1 and a radius of the window is R2, wherein R2 and R1 satisfy: $10\% \le (R1-R2)/R1 \le 85\%$.

6. The wireless location device protection apparatus according to claim 1, wherein a seal structure is provided between the edge of the upper surface of the cover body and the inner wall face of the enclosure portion.

7. The wireless location device protection apparatus according to claim 6, wherein the seal structure comprises an annular groove and an annular protrusion, the annular protrusion being provided on one of the edge of the upper surface of the cover body and the inner wall face of the enclosure portion, the annular groove being provided on the other of the edge of the upper surface of the cover body and the inner wall face of the enclosure portion, the annular protrusion being engaged with the annular groove.

8. The wireless location device protection apparatus according to claim 1, wherein a location structure is provided between the edge of the upper surface of the cover body and the inner wall face of the enclosure portion.

9. The wireless location device protection apparatus according to claim 8, wherein the location structure comprises an annular groove and an annular protrusion, the annular protrusion being provided on one of the edge of the upper surface of the cover body and the inner wall face of the enclosure portion, the annular groove being provided on the other of the edge of the upper surface of the cover body and the inner wall face of the enclosure portion, the annular protrusion being engaged with the annular groove.

10. The wireless location device protection apparatus according to claim 1, wherein the lower surface of the cover body is recessed to form a location groove for receiving a top of an upper surface of the wireless location device.

11. The wireless location device protection apparatus according to claim 1, wherein a periphery of the cover body is bent toward a side wall of the wireless location device to form a shielding flange, an inner wall of the shielding flange being adapted to fit with at least a portion of the side wall of the wireless location device.

12. The wireless location device protection apparatus according to claim 1, wherein an inner wall of the first base portion or the second base portion is convexly provided with an annular location step that supports a lower end edge of the cover body.

13. The wireless location device protection apparatus according to claim 1, wherein the protection element further comprises a periphery portion provided circumferentially at a juncture of the side wall of the first base portion and the side wall of the second base portion.

14. The wireless location device protection apparatus according to claim 1, wherein the protection element further comprises an attachment portion formed by extending side walls of the first base portion and the second base portion away from the central axis.

15. The wireless location device protection apparatus according to claim 14, wherein an end of the attachment portion away from the central axis is provided with an attachment duct, an axis of the attachment duct is perpendicular to the central axis, and the attachment duct extends through the end in the direction perpendicular to the extension direction of the attachment portion and has a preset length.

16. The wireless location device protection apparatus according to claim 15, further comprising a hanging member, the hanging member extending through the attachment duct.

17. The wireless location device protection apparatus according to claim 1, wherein the first base portion, the second base portion, the cover body, and the window are each radially symmetric about the central axis.

18. The wireless location device protection apparatus according to claim 1, wherein the inner space has a flat spherical shape.

19. The wireless location device protection apparatus according to claim 1, wherein the protection element is integrated.

20. The wireless location device protection apparatus according to claim 1, wherein the protection element is of a flexible structure.

\* \* \* \* \*